(12) United States Patent
Chen et al.

(10) Patent No.: US 12,451,196 B2
(45) Date of Patent: Oct. 21, 2025

(54) OPERATING METHOD OF MEMORY DEVICE AND MEMORY SYSTEM

(71) Applicant: MACRONIX International Co., Ltd., Hsinchu (TW)

(72) Inventors: Che-Ping Chen, Taipei (TW); Ya-Jui Lee, Taichung (TW)

(73) Assignee: MACRONIX International Co., Ltd., Hsinchu (TW)

( * ) Notice: Subject to any disclaimer, the term of this patent is extended or adjusted under 35 U.S.C. 154(b) by 187 days.

(21) Appl. No.: 18/475,247

(22) Filed: Sep. 27, 2023

(65) Prior Publication Data

US 2025/0104778 A1 Mar. 27, 2025

(51) Int. Cl.
| | | |
|---|---|---|
| G11C 7/00 | (2006.01) | |
| G11C 16/04 | (2006.01) | |
| G11C 16/08 | (2006.01) | |
| G11C 16/10 | (2006.01) | |
| G11C 16/26 | (2006.01) | |

(52) U.S. Cl.
CPC .......... *G11C 16/26* (2013.01); *G11C 16/0483* (2013.01); *G11C 16/08* (2013.01); *G11C 16/10* (2013.01)

(58) Field of Classification Search
CPC ....... G11C 7/1051; G11C 7/22; G11C 7/1072; G11C 7/1006; G11C 7/1066
USPC ....................................... 365/189.15, 185.18
See application file for complete search history.

(56) References Cited

U.S. PATENT DOCUMENTS

| | | | |
|---|---|---|---|
| 7,965,555 B2 * | 6/2011 | Namiki | G11C 16/3454 |
| | | | 365/185.17 |
| 10,854,250 B2 | 12/2020 | Lee et al. | |
| 2010/0067305 A1 | 3/2010 | Park et al. | |
| 2014/0098610 A1 * | 4/2014 | Huang | G11C 11/5642 |
| | | | 365/185.11 |
| 2019/0130953 A1 | 5/2019 | Lee et al. | |

OTHER PUBLICATIONS

"Office Action of Taiwan Counterpart Application", issued on Mar. 12, 2025, p. 1-p. 6.

* cited by examiner

*Primary Examiner* — Son T Dinh
(74) *Attorney, Agent, or Firm* — J.C. PATENTS

(57) ABSTRACT

An operation method of a memory device including the following operations is provided. Applying a read voltage to a selected page of a plurality of programmed memory pages. Applying a first pass voltage to unselected pages of the plurality of programmed memory pages. Applying a second pass voltage to at least one unprogrammed memory page, wherein the first pass voltage is larger than the second pass voltage. A memory system including a 3D NAND flash memory with high capacity and high performance is also provided.

18 Claims, 10 Drawing Sheets

BLKa₁

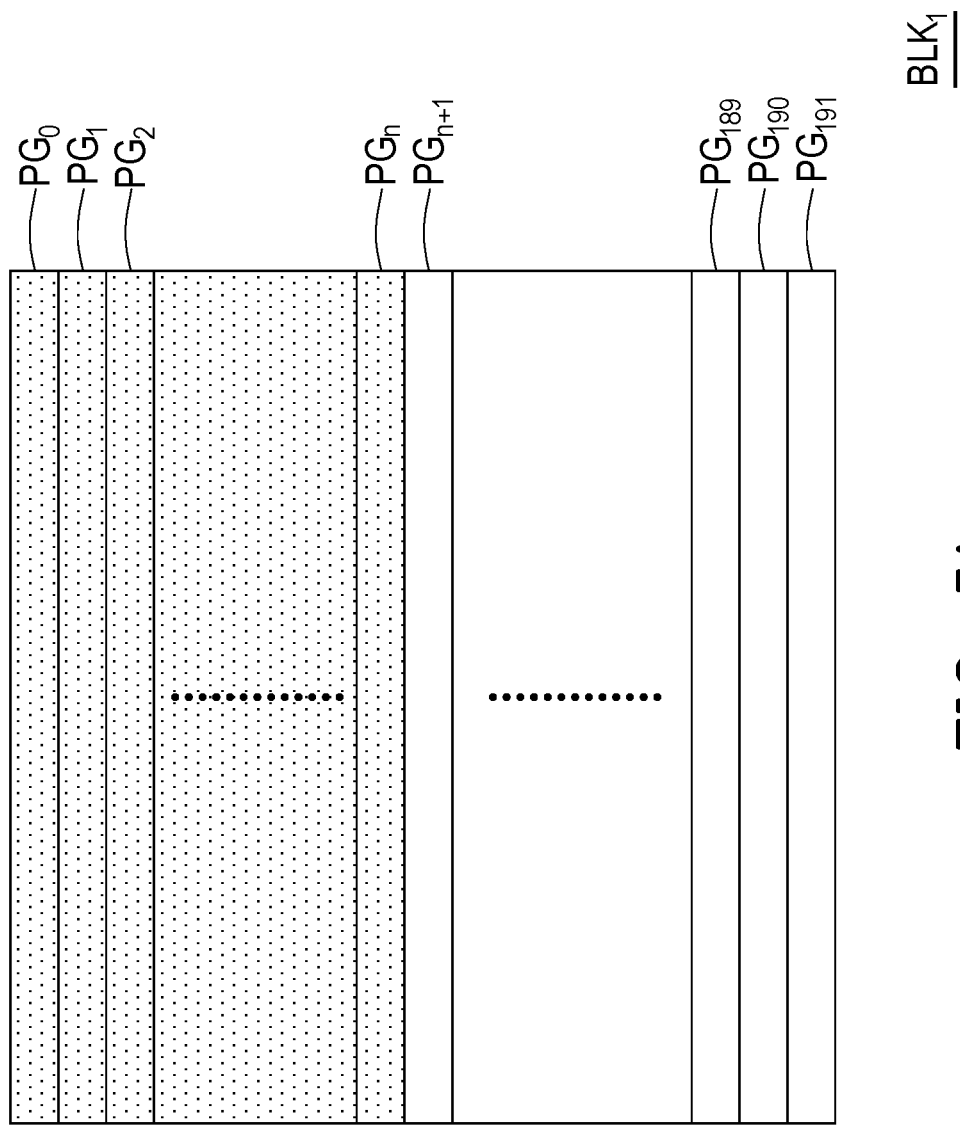

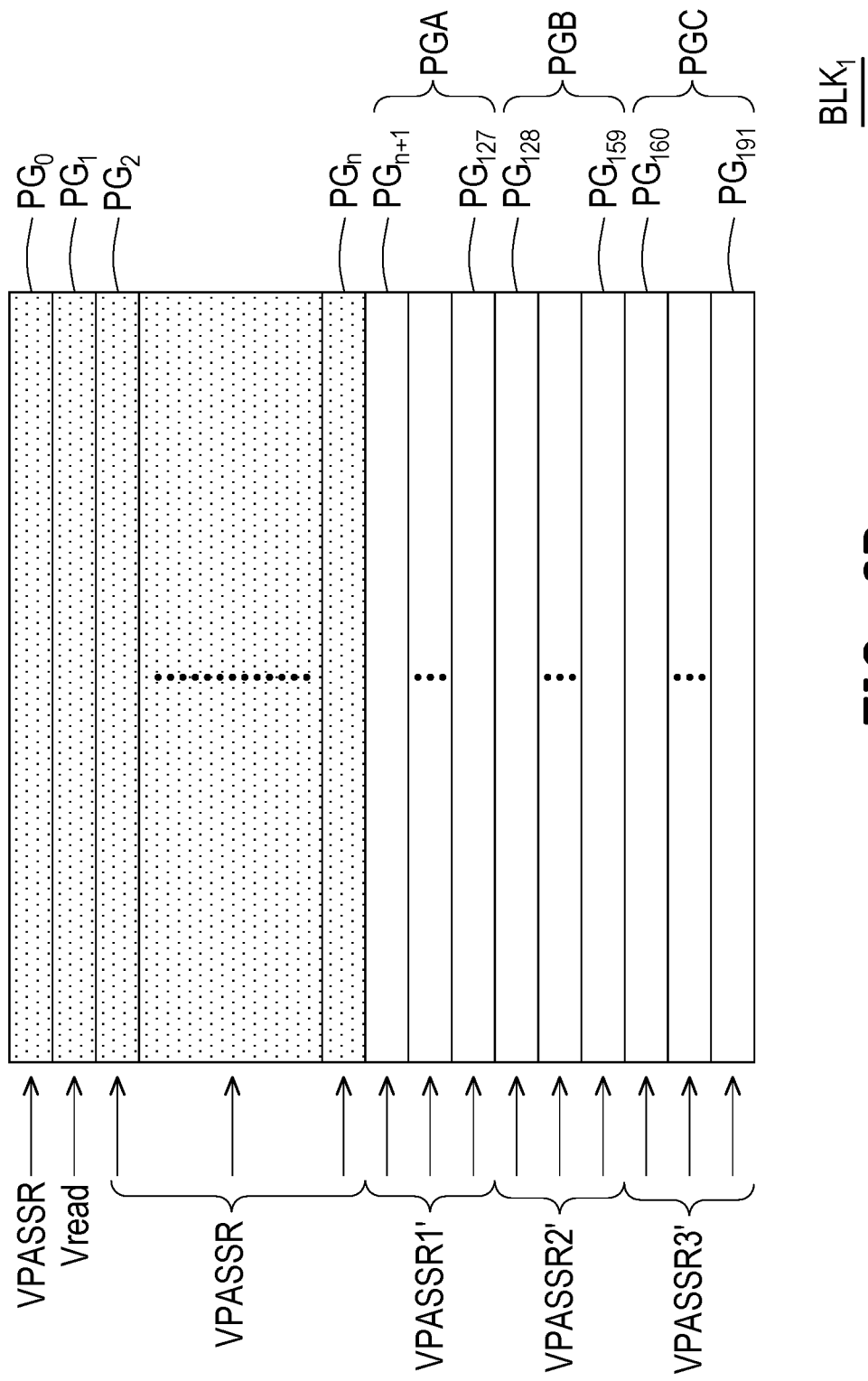

OPERATING METHOD OF MEMORY DEVICE AND MEMORY SYSTEM

BACKGROUND

Technical Field

The disclosure relates to an operating method of a memory device and a memory system, and in particular to a reading method of a memory device and a memory system.

Description of Related Art

Performing a program operation is to write data to a memory device. However, the program operation performed in the memory device may be interrupted due to operations from the user or external factors, in which only a portion of memory pages in the selected memory block is programmed. The selected memory block including a programmed memory page and an unprogrammed memory page is called an open block.

When a read operation is performed on the open block, the operating window of the memory device will gradually decrease with the continuous read operation. The pass voltage applied to the word lines corresponding to the unprogrammed memory pages would increase the read stress and shorten the threshold voltage window (Vt window) of the corresponding memory cell in the unprogrammed memory pages. Therefore, the reliability of the memory device would be reduced.

SUMMARY

The disclosure provides an operation method of a memory device, which could reduce the reading stress of the at least one unprogrammed memory page, thereby improving the reliability of the memory device.

In the operating method of the memory device provided by the disclosure, the memory device including a memory block comprising a first memory string and a second memory string. Each of the first memory string and the second memory string has multiple memory cells connected in series, and each memory cell in the first memory string and the second memory string is connected to a same word line belongs to a programmed memory page or an unprogrammed memory page. The operation method includes performing a read operation on the memory block of the memory device, the memory block including the plurality of programmed memory pages and the at least one unprogrammed memory page. The read operation includes operations below. Applying a read voltage to a selected memory page of the plurality of programmed memory pages. Applying a first pass voltage to unselected memory pages of the plurality of programmed memory pages. Applying a second pass voltage to at least one unprogrammed memory page. The first pass voltage is greater than the second pass voltage.

The disclosure provides a memory system with the improved reliability.

The memory system provided by the disclosure includes a memory device and a controller. The memory device includes a memory cell array, an address decoder, a voltage generator, a page buffer and a control logic. The memory cell array comprises a plurality of memory blocks, wherein one of the memory blocks comprises a first memory string and a second memory string. Each of the first memory string and the second memory string has multiple memory cells connected in series, wherein each memory cell in the first memory string and the second memory string connected to a same word line belongs to a programmed memory page or an unprogrammed memory page. The address decoder is coupled to the memory cell array. The voltage generator is coupled to the address decoder and is configured to generate voltages provided to the programmed memory page and the unprogrammed memory page. The page buffer is coupled to the memory cell array. The control logic is coupled to the address decoder, the voltage generator and the page buffer. The controller is coupled to the memory device and is configured to propose a read command to the memory device to control a read operation performed in the memory device. The control logic determines a voltage value of a pass voltage provided to the programmed memory page and the unprogrammed memory page in the read operation in accordance with a programming state of the memory device. The pass voltage includes a first pass voltage applied to the programmed memory page and a second pass voltage applied to the at least one unprogrammed memory page, and the first pass voltage is greater than the second pass voltage.

Based on the above, since the first pass voltage applied to the programmed memory page is greater than the second pass voltage applied to the at least one unprogrammed memory page, the read stress on the at least one unprogrammed memory page could be reduced. Therefore, the possibility of shortening the threshold voltage window of the memory cell in the at least one unprogrammed memory page could be reduced, so as to improve the reliability of the memory device.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 5A is a schematic diagram illustrating an open block in a memory array according to an embodiment of the disclosure.

FIG. 6B is a schematic diagram illustrating a read operation performed on an open block in a memory array according to another embodiment of the disclosure.

DESCRIPTION OF THE EMBODIMENTS

The following examples are listed and described in detail with accompanying drawings, but the provided examples are not intended to limit the scope of the disclosure. In addition, the drawings are for illustrative purposes only and are not drawn to original size. To facilitate understanding, the same elements will be identified with the same symbols in the following description.

Figure 1:
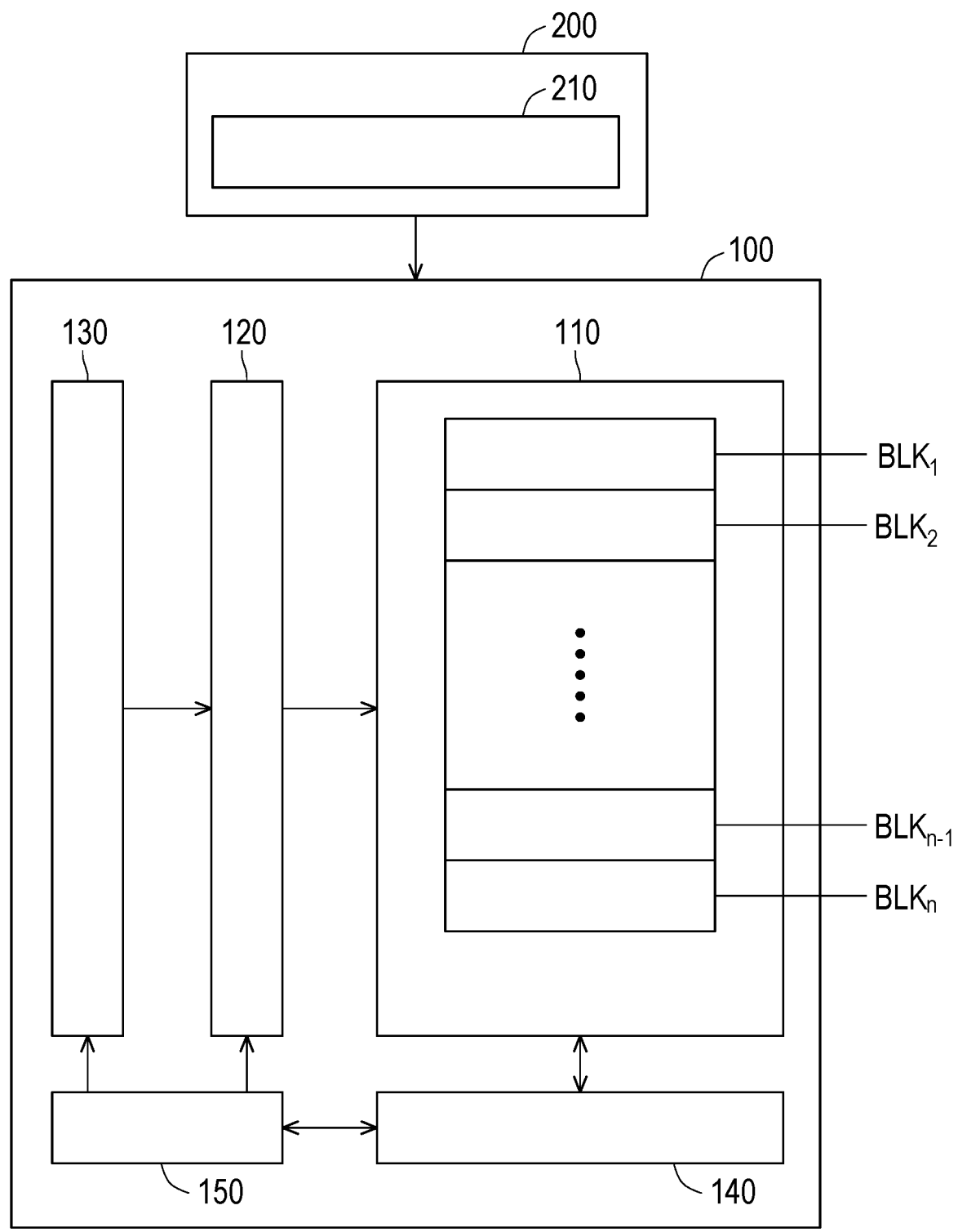
FIG. 1 is a block diagram of a memory system according to an embodiment of the disclosure.
Figure 2A:
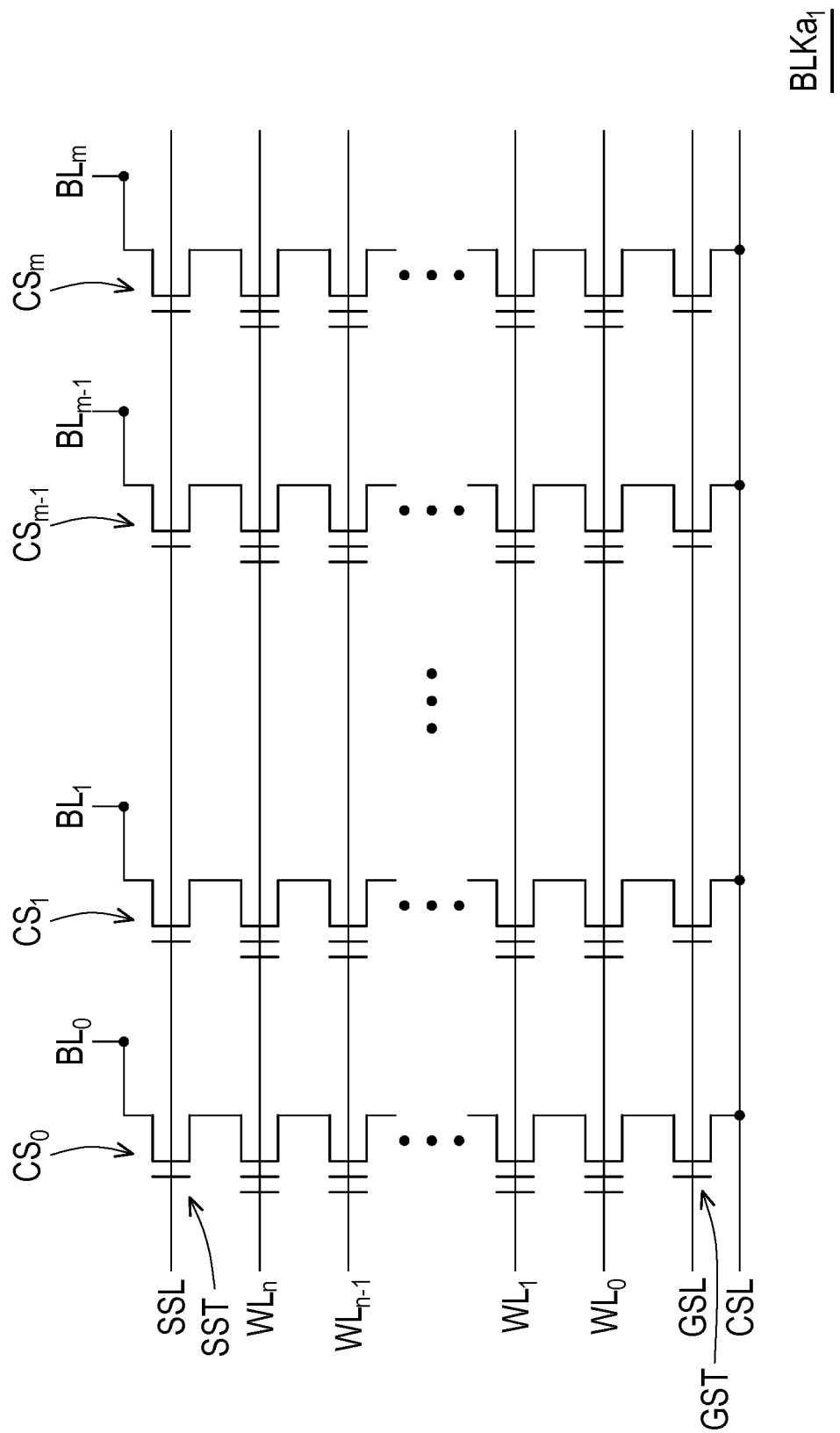
FIG. 2A is a partial schematic diagram of an embodiment of a memory block in a memory array of FIG. 1.
Figure 2B:
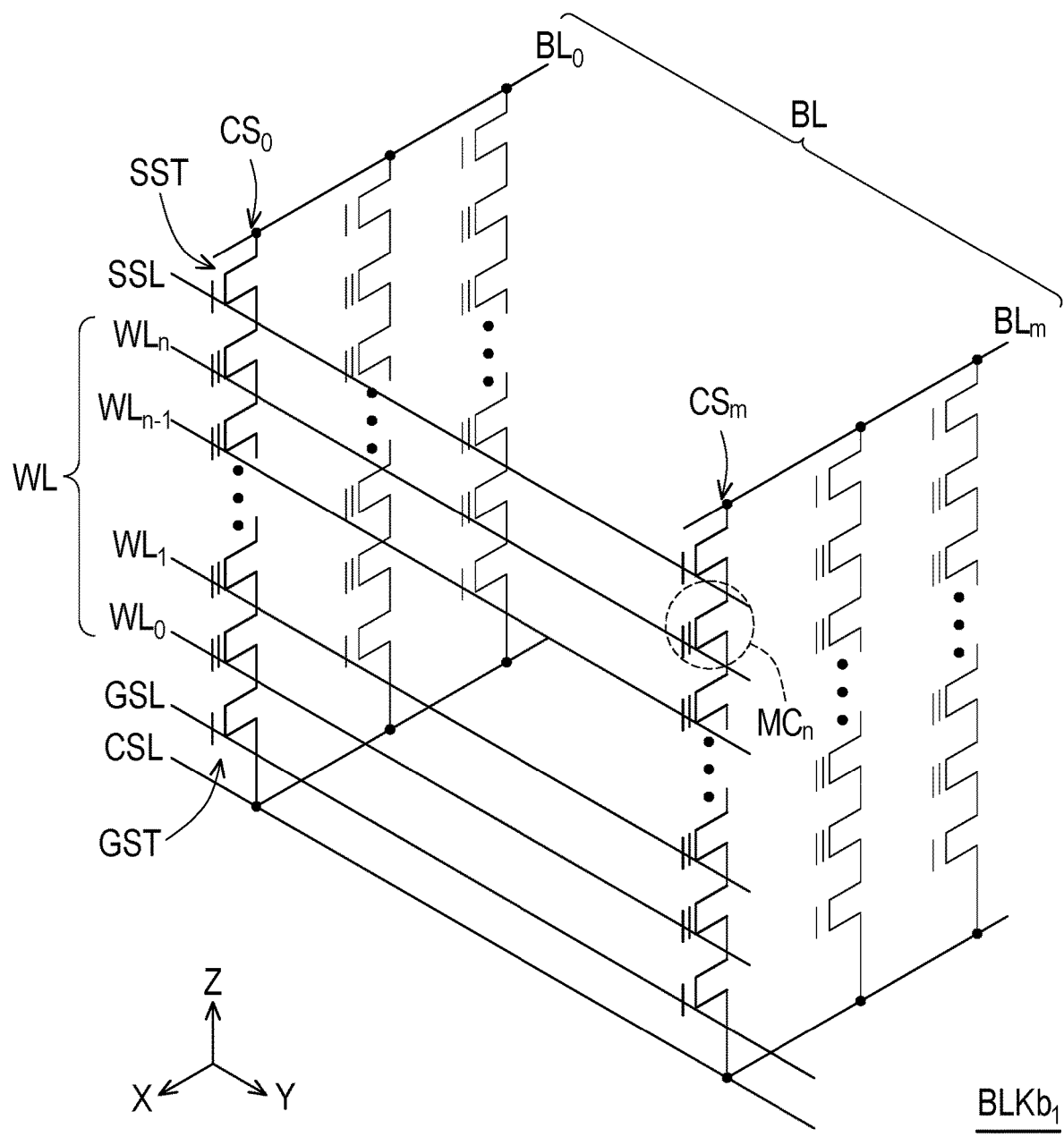
FIG. 2B is a partial schematic diagram of another embodiment of a memory block in a memory array of FIG. 1.

FIG. 1 is a block diagram of a memory system according to an embodiment of the disclosure, FIG. 2A is a partial schematic diagram of an embodiment of a memory block in the memory array of FIG. 1, and FIG. 2B is a partial schematic diagram of another embodiment of a memory block in the memory array of FIG. 1.

Please refer to FIG. 1, which illustrates a memory system 10 of an embodiment. The memory system 10 could include a three-dimensional (3D) memory, which may be a 3D NAND flash memory with high capacity and high performance, but the disclosure is not limited thereto. The memory system 10 could also include a two-dimensional memory (2D), which may be a 2D NAND flash memory. In the present embodiment, the memory system 10 includes a memory device 100 and a controller 200.

The memory device 100 could be configured to store data to be accessed by an external host device (not shown). For example, the memory device 100 could provide stored data to the external host device during a read operation and could store data provided from the external host device during a program operation.

In the present embodiment, the memory device 100 includes a memory cell array 110, an address decoder 120, a voltage generator 130, a page buffer 140 and a control logic 150, but the disclosure is not limited thereto.

The memory array 110 could include a plurality of memory blocks $BLK_1$~$BLK_n$, wherein each of the plurality of memory blocks $BLK_1$~$BLK_n$ could be a 2D memory block or a 3D memory block. In detail, taking the memory block $BLK_1$ as an example, the memory block $BLK_1$ could be a 2D memory block $BLKa_1$ shown in FIG. 2A or a 3D memory block $BLKb_1$ shown in FIG. 2B. However, the disclosure is not limited thereto.

Please refer to FIG. 2A, the 2D memory block $BLKa_1$ of the present embodiment includes a plurality of memory strings $CS_0$~$CS_m$, a plurality of bit lines $BL_0$~$BL_m$, a plurality of word lines $WL_0$~$WL_n$, a string select line SSL, a ground select line GSL, and a common source line CSL.

Each of the plurality of memory strings $CS_0$~$CS_m$ is respectively connected to a corresponding bit line $BL_0$~$BL_m$. In some embodiments, each of the plurality of memory strings $CS_0$~$CS_m$ could include a string select transistor SST, a plurality of memory cells, and a ground select transistor GST connected in series with each other. The string select transistor SST is connected to the string select line SSL, and the ground select transistor GST is connected to the ground select line GSL. In addition, the string select transistor SST could be connected to the corresponding bit line $BL_0$~$BL_m$, and the ground select transistor GST could be connected to the common source line CSL. The memory cells in the plurality of memory strings $CS_0$~$CS_m$ are respectively connected to the corresponding word line $WL_0$~$WL_n$ to form a plurality of memory pages. For example, each memory cell in the memory string $CS_0$ to the memory string $CS_m$ connected to the same word line (the word line $WL_n$ as an example) could form one memory page. In some embodiments, the common source line CSL is commonly connected to the plurality of memory strings $CS_0$~$CS_m$.

It is worth mentioned that the 2D memory block $BLKa_1$ of the disclosure is not limited to the above embodiment.

Please refer to FIG. 2B, the 3D memory block $BLKb_1$ of the present embodiment includes a plurality of memory strings $CS_0$~$CS_m$, a plurality of bit lines $BL_0$~$BL_m$, a plurality of word lines $WL_0$~$WL_n$, a string select line SSL, a ground select line GSL, and a common source line CSL. It is worth mentioned that another memory strings in the 3D memory block $BLKb_1$ is not marked in FIG. 2B to keep the partial schematic diagram concise.

The plurality of memory strings $CS_0$~$CS_m$ could extend in a first direction Z, wherein each of the plurality of memory strings $CS_0$~$CS_m$ is respectively connected to the corresponding bit line $BL_0$~$BL_m$ extending in a second direction X. In some embodiments, each of the plurality of memory strings $CS_0$~$CS_m$ could include a string select transistor SST, a plurality of memory cells, and a ground select transistor GST connected in series with each other. The string select transistor SST is connected to the string select line SSL, and the ground select transistor GST is connected to the ground select line GSL. In addition, the string select transistor SST could be connected to the corresponding bit line $BL_0$~$BL_m$, and the ground select transistor GST could be connected to the common source line CSL. The memory cells in the plurality of memory strings $CS_0$~$CS_m$ are respectively connected to the corresponding word line $WL_0$~$WL_n$ (a layer extending in the second direction X and a third direction Y) to form a plurality of memory pages which are stacked in the first direction Z. In some embodiments, the common source line CSL is commonly connected to the plurality of memory strings $CS_0$~$CS_m$.

Please refer to FIG. 1 and FIG. 2B simultaneously, the 3D memory block $BLKb_1$ would be taken as an example to introduce the relationship of the coupling between the above components in the memory device 100.

In the following descriptions, the plurality of bit lines $BL_0$~$BL_m$ are referred as the bit line BL. The plurality of word lines $WL_0$~$WL_n$ are referred as the word line WL. In some embodiments, the string select line SSL, the word line WL and the ground select line GSL could be controlled by the address decoder 120, the bit line BL could be controlled by the page buffer 140, and the common source line CSL could be controlled by the control logic 150.

The address decoder 120 is coupled to the memory cell array 110. Specifically, the address decoder 120 is coupled to the memory cell array 110 by the word line WL. In some embodiments, the address decoder 120 is configured to operate under control of the control logic 150. For example, the address decoder 120 may receive an address data from the outside by the control logic 150, wherein the address data may include a word line address. In some embodiments, the address decoder 120 includes a word line decoder (not shown), but the disclosure is not limited thereto.

The word line decoder could be configured to decode the word line address so as to apply a voltage provided from the voltage generator 130 to the corresponding word line WL according to the decoded word line address. For example, during performing of a read operation, the word line decoder could apply a read voltage to a selected word line (for example, a selected word line $WL_n$ shown in FIG. 2B) and a pass voltage to unselected word lines (word lines other than the selected word line $WL_n$ shown in FIG. 2B), so as to perform the read operation on a selected memory cell (for example, a memory cell $MC_n$ in the memory string $CS_m$ shown in FIG. 2B) on the word line $WL_n$.

The voltage generator 130 is coupled to the address decoder 120 and configured to generate the voltage provided to memory strings $CS_0$ to $CS_m$. In some embodiments, the voltage generator 130 includes a plurality of internal power sources (not shown). The plurality of internal power sources are started under the control of the control logic 150 to generate a plurality of voltages, wherein the plurality of generated voltages are applied to the corresponding word lines $WL_0$~$WL_n$ by the address decoder 120.

The page buffer 140 is coupled to the memory cell array 110. In some embodiments, the page buffer 140 may include a plurality of page buffer units (not shown) connected to the bit lines $BL_0$~$BL_m$ respectively, and operates under the control of the control logic 150. For example, during the read operation, the page buffer 140 reads the data of the memory cells connected to the selected word line through the corresponding bit line $BL_0$~$BL_m$, and outputs the read data through a data input/output unit (not shown) coupled to the page buffer 140 to the external host device.

The control logic 150 is coupled to the address decoder 120, the voltage generator 130 and the page buffer 140. In some embodiments, the control logic 150 receives a read command and the address data from the controller 200, and controls the address decoder 120, the voltage generator 130 and the page buffer 140 in response to the read command. In addition, the control logic 150 sends the above address data to the address decoder 120.

The controller 200 could control the memory device 100 in response to requests from the external host device. In detail, the controller 200 could control the read operation, program operation, erase operation and/or other suitable operations of the memory device 100. For example, the controller 200 could output data read from the memory device 100 to the external host device, and could store data inputted from the external host device in the memory device 100. In the present embodiment, the controller 200 could issue a read command to the memory array 110 in the memory device 100 to control the read operation performed in the memory device 100.

In the present embodiment, the controller 200 includes a storage unit 210. When the controller 200 controls the operation of the memory device 100, the storage unit 210 could be used to record an information pertaining performing the read operation, program operation, erase operation and/or other suitable operations on the memory device 100. For example, an information of the programming state recorded by the controller 200 includes a last memory page that the program operation is performed on the plurality of memory blocks $BLK_1$~$BLK_n$.

In the present embodiment, the storage unit 210 could record a programming state of each memory blocks $BLK_1$~$BLK_n$ of the memory array 110. In detail, in some embodiments, the controller 200 could also issue a program command to at least one memory block $BLK_1$~$BLK_n$ in the memory array 110 to control the program operation performed in the memory device 100.

Each memory blocks $BLK_1$~$BLK_n$ could be divided into an open block or a closed block in accordance with their programming state. In detail, among the plurality of memory blocks $BLK_1$~$BLK_n$, the memory block including only a portion of the memory pages programmed in the program operation and the other portion of the memory pages unprogrammed is called the open block. The memory block in which all memory pages are programmed in the program operation is called the closed block. The reason for the formation of the open block could be that the program operation is interrupted due to operations by the user or external factors, so that the open block includes at least one programmed memory page and at least one unprogrammed memory page. In some embodiments, the controller 200 could distinguish the at least one programmed memory page from the at least one unprogrammed memory page through the programming state of each memory blocks $BLK_1$~$BLK_n$ of the memory array 110 recorded by the storage unit 210.

In the present embodiment, the controller 200 could distinguish the closed block from the open block through the programming state of each memory blocks $BLK_1$~$BLK_n$ of the memory array 110 recorded by the storage unit 210. In detail, the controller 200 could distinguish the open blocks by the last memory page programmed in each memory blocks $BLK_1$~$BLK_n$ recorded in the storage unit 210 during the program operation. For example, taking the memory block $BLK_n$ is the closed block as an example, the controller 200 could check whether the address of the last programmed memory page stored in the memory block $BLK_1$ and the address of the last programmed memory page stored in the memory block $BLK_n$ are the same or not, to determine whether all memory pages in the checked memory block $BLK_1$ have been programmed, thereby determining the memory block $BLK_1$ is the open block or the closed block.

In the present embodiment, when performing the read operation on the memory device 100, the controller 200 could utilize the information pertaining the closed block and the open block stored in the storage unit 210 to generate a corresponding read command.

In detail, when performing the read operation on the open block in the memory device 100, the control logic 150 can respond to the read command from the controller 200 to control the voltage generator 130, so that the voltage generator 130 could provide corresponding operating voltages to the address decoder 120. The address decoder 120 could apply a read voltage to a selected memory page among the plurality of programmed memory pages, apply a first pass voltage to unselected memory pages of the plurality of programmed memory pages, and apply a second pass voltage to at least one unprogrammed memory page. In the present embodiment, the first pass voltage is greater than the second pass voltage. In some embodiments, a difference between the first pass voltage and the second pass voltage is greater than 300 mV.

By making the first pass voltage applied to the unselected memory pages in the programmed memory pages greater than the second pass voltage applied to the at least one unprogrammed memory page, the read stress on the at least one unprogrammed memory page could be reduced. Therefore, the possibility of shortening the threshold voltage window of the memory cell in the at least one unprogrammed memory page could be reduced, so as to improve the reliability of the memory device.

Figure 3:
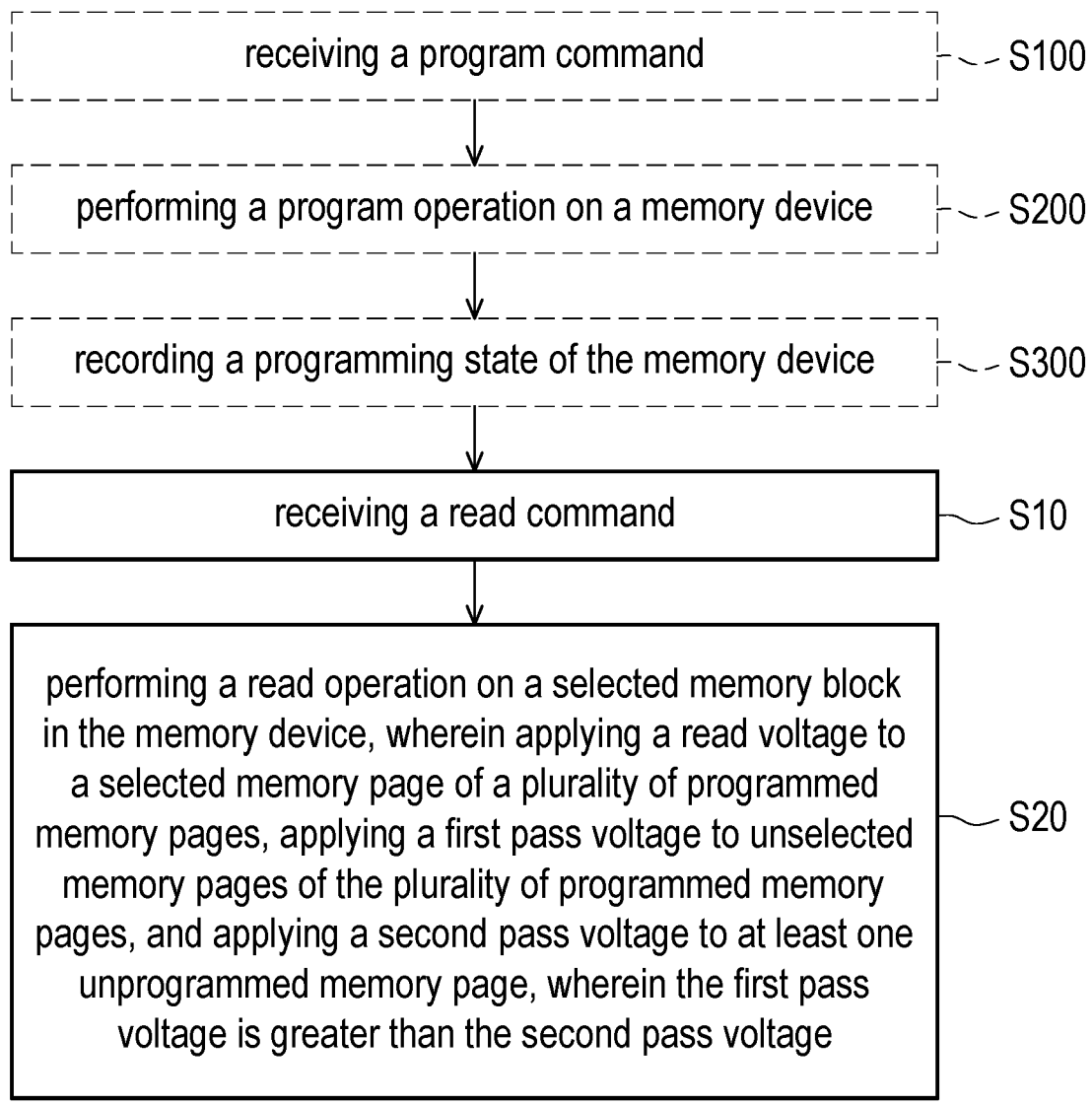
FIG. 3 is a flowchart of an operating method of a memory device according to an embodiment of the disclosure.

FIG. 3 is a flowchart of an operating method of a memory device according to an embodiment of the disclosure. It is worth mentioned that the memory device described in FIG. 3 takes the memory device 100 as an example, but it should be noted that the disclosure is not limited thereto.

Please refer to FIG. 3, an operating method OP of the memory device of the present embodiment includes the following steps. First, in a step S10, receiving a read command. After that, in a step S20, performing a read operation on a selected memory block in the memory device, wherein applying a read voltage to a selected memory page of a plurality of programmed memory pages, applying a first pass voltage to unselected memory pages of the plurality of programmed memory pages, and applying a second pass voltage to at least one unprogrammed memory page, wherein the first pass voltage is greater than the second pass voltage.

In some embodiments, before performing the step S10, a step S100, a step S200 and a step S300 could be performed in sequence; however, the disclosure is not limited thereto.

First, in the step S100, receiving a program command. After that, in the step S200, performing a program operation on at least one memory block in the memory device. Next, in the step S300, recording the programming state of the at least one memory block.

In the step S100, the controller 200 could receive the program command from the external host device, and perform the program operation corresponding to the program command on the memory device 100.

Figure 4:
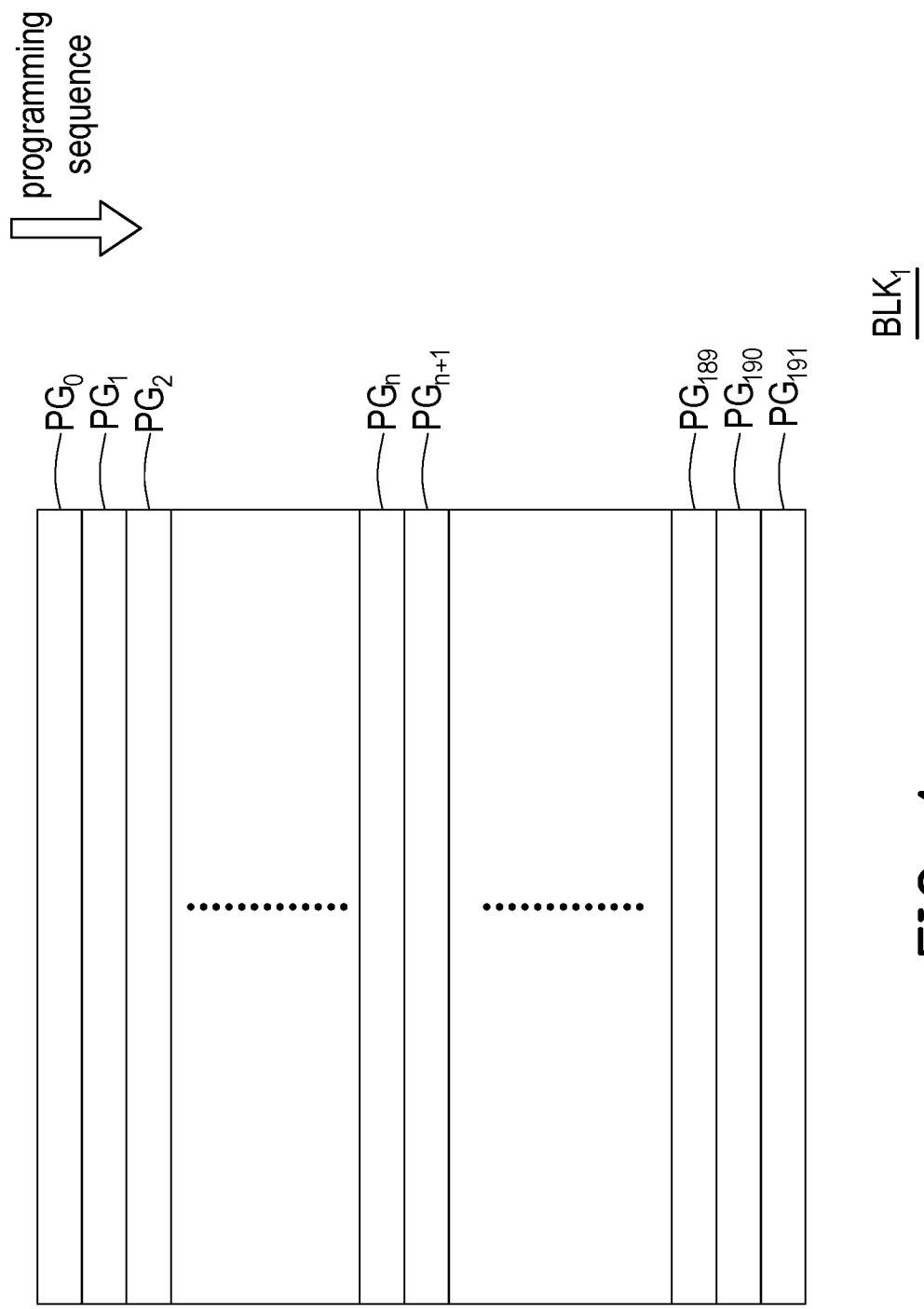
FIG. 4 is a schematic diagram illustrating a programming sequence of a memory block in a memory array during a program operation according to an embodiment of the disclosure.

In the step S200, performing the program operation on the memory device 100. In detail, the program operation is performed on the at least one memory block $BLK_1 \sim BLK_n$ in the memory array 110 of the memory device 100. It is worth mentioned that taking the program operation to the memory block $BLK_1$ shown in FIG. 4 as an example, in the present embodiment, although the program operation is performed from a top of the memory block $BLK_1$ to a bottom of the memory block $BLK_1$ (in the order from the memory page $PG_0$ to the memory page $PG_{191}$) as an example, but the disclosure is not limited to thereto. That is, in other embodiments, the program operation could be performed from the bottom of the memory block $BLK_1$ to the top of the memory block $BLK_1$ (in the order from memory page $PG_{191}$ to memory page $PG_0$).

Figure 5B:
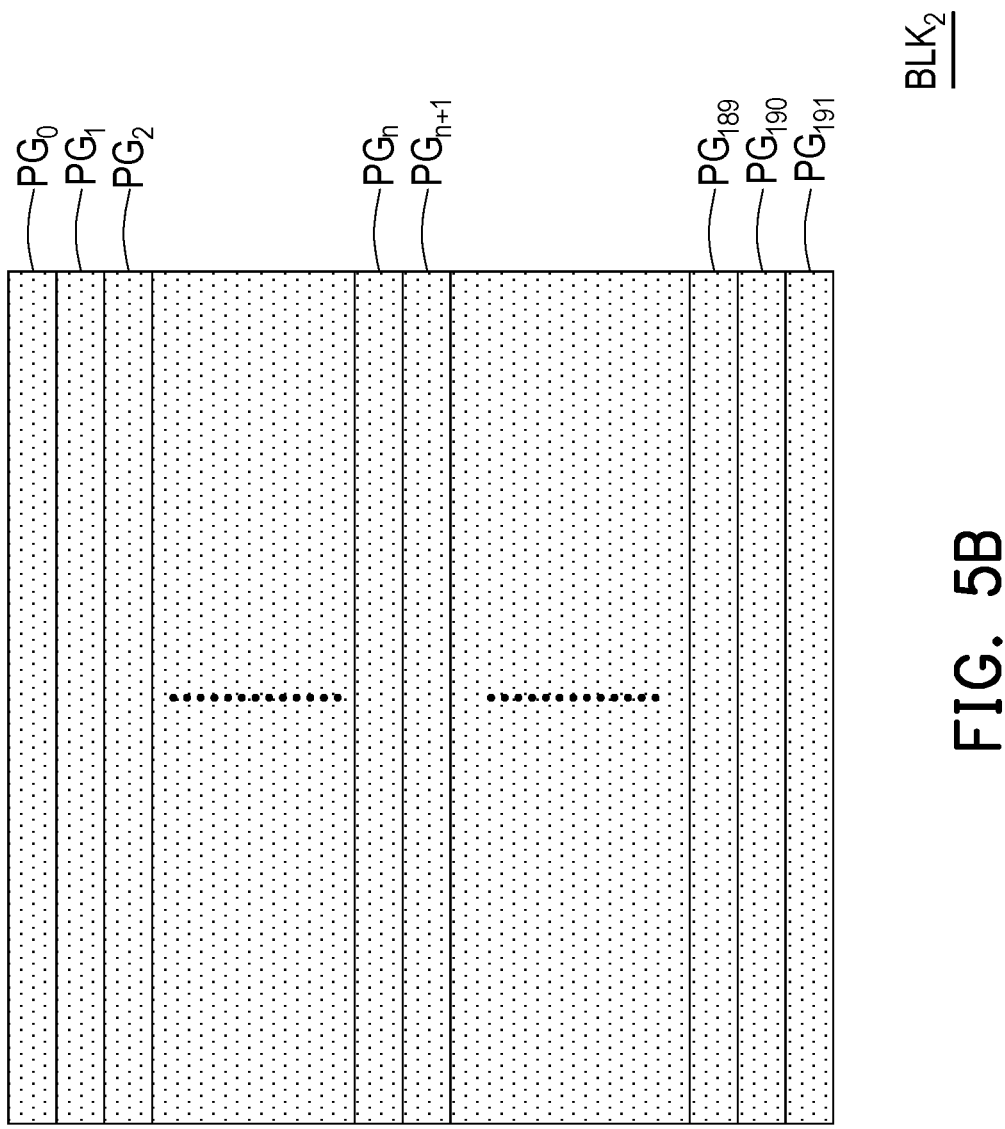
FIG. 5B is a schematic diagram illustrating a closed block in a memory array according to an embodiment of the disclosure.

In the step S300, recording the programming state of the memory device 100. In detail, recording the programming state of each memory blocks $BLK_1 \sim BLK_n$ of the memory device 100. As described in the above embodiment, each memory blocks $BLK_1 \sim BLK_n$ could be divided into the open block or the closed block according to their programming state. In detail, an example would be described below in which the memory block $BLK_1$ and the memory block $BLK_2$ are performed the program operation. As shown in FIG. 5A, the memory block $BLK_1$ is the open block including the programmed memory pages $PG_0 \sim PG_n$ and the unprogrammed memory pages $PG_{n+1} \sim PG_{191}$. In one embodiment, there is at least one unprogrammed memory page $PG_{n+1} \sim PG_{191}$. As shown in FIG. 5B, the memory block $BLK_2$ is the closed block including all programmed memory pages $PG_0 \sim PG_{191}$.

The step S10 could be performed after performing the above step S100 to step S300, but the disclosure is not limited to thereto. In the step S10, the read command issued from the external host device could be received by the controller 200, and the read operation corresponding to the read command is performed on the memory device 100, which includes selecting one of the plurality of memory blocks $BLK_1 \sim BLK_n$ in the memory array 110 to be read.

When performing the step S20, the controller 200 could determine the selected memory block is the open block or the closed block according to the information pertaining the plurality of memory blocks $BLK_1 \sim BLK_n$ after the program operation stored in the storage unit 210. After that, the control logic 150 could respond to the read command from the controller 200 to control the voltage generator 130, so that the voltage generator 130 could generate the corresponding read voltage and the corresponding pass voltages provided to the selected one of the memory blocks $BLK_1 \sim BLK_n$.

Figure 6A:
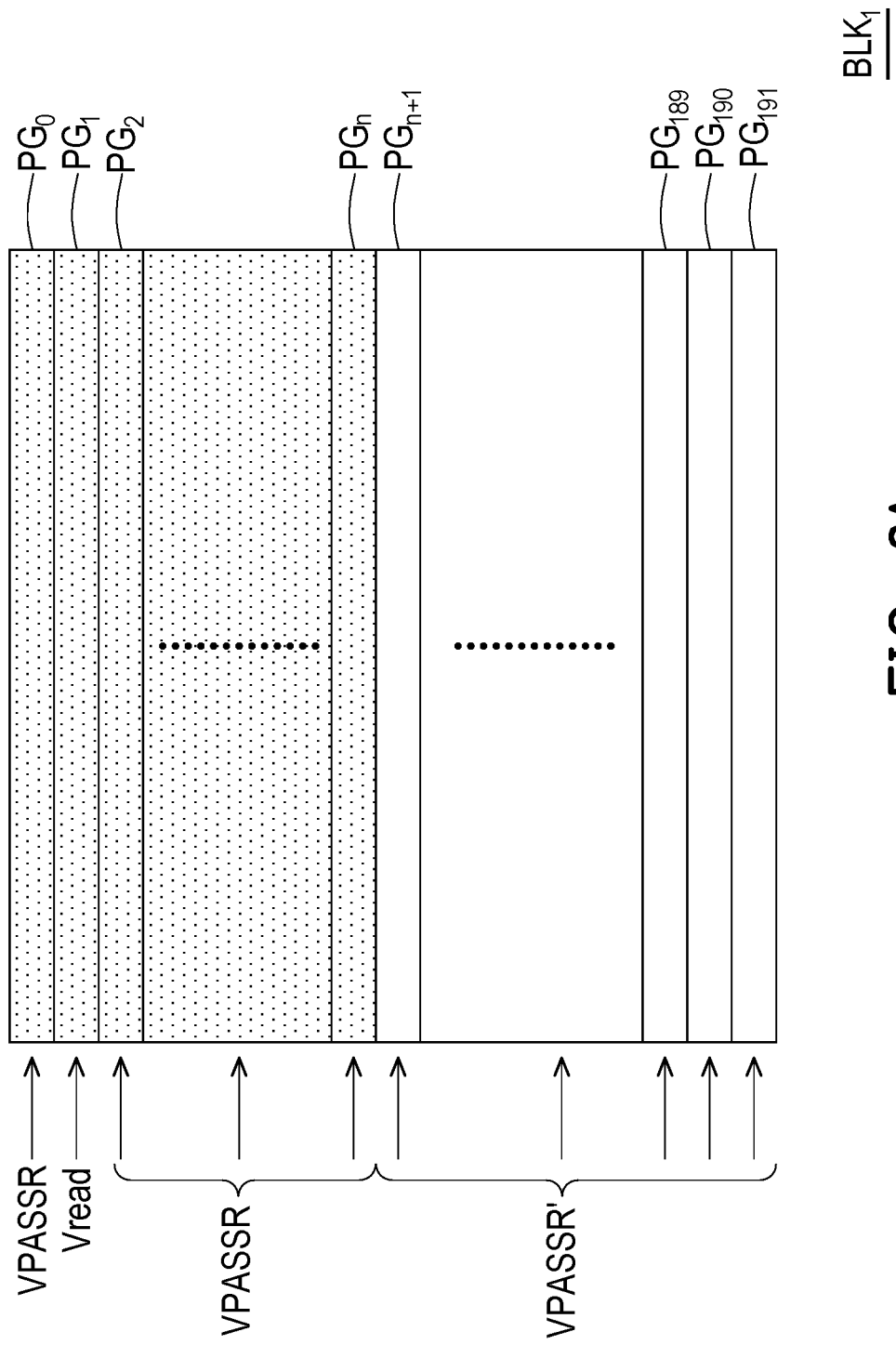
FIG. 6A is a schematic diagram illustrating a read operation performed on an open block in a memory array according to an embodiment of the disclosure.

For example, as shown in FIG. 6A, when the selected memory block is the memory block $BLK_1$ (the open block), applying the read voltage Vread to the selected memory page (the memory page $PG_1$) of the plurality of programmed memory pages $PG_0 \sim PG_n$, applying the first pass voltages VPASSR to the unselected memory pages (the memory page $PG_0$ and the memory pages $PG_2 \sim PG_n$) of the plurality of programmed memory pages $PG_0 \sim PG_n$, and applying the second pass voltages VPASSR' to at least one unprogrammed memory page $PG_{n+1} \sim PG_{191}$. The at least one unprogrammed memory page $PG_{n+1} \sim PG_{191}$ is also the unselected memory page $PG_{n+1} \sim PG_{191}$. It is worth mentioned that each memory cells in the first memory string (such as the memory string $CS_0$) and the second memory string (such as the memory string $CS_m$) connected to the same word line (such as the word line $WL_n$) could belong to the programmed memory page or the unprogrammed memory page, which would not be described again below.

In the present embodiment, the first pass voltages VPASSR applied to the unselected memory pages (the memory page $PG_0$ and the memory pages $PG_2 \sim PG_n$) among the plurality of programmed memory pages $PG_0 \sim PG_n$ is greater than the second pass voltages VPASSR' applied to the at least one unprogrammed memory page $PG_{n+1} \sim PG_{191}$. In some embodiments, a difference between the first pass voltages VPASSR and the second pass voltages VPASSR' is greater than 300 mV.

Since the first pass voltages VPASSR are greater than the second pass voltages VPASSR', the read stress on the at least one unprogrammed memory page $PG_{n+1} \sim PG_{191}$ could be reduced. Therefore, the possibility of shortening the threshold voltage window of the memory cell in the at least one unprogrammed memory page $PG_{n+1} \sim PG_{191}$ could be reduced, so as to improve the reliability of the memory device 100.

In the present embodiment, the second pass voltages VPASSR' applied to the at least one unprogrammed memory page $PG_{n+1} \sim PG_{191}$ are the same, but the disclosure is not limited thereto.

In detail, the above at least one unprogrammed memory page $PG_{n+1} \sim PG_{191}$ may include multiple unprogrammed memory pages $PG_{n+1} \sim PG_{191}$. The multiple unprogrammed memory pages $PG_{n+1} \sim PG_{191}$ could be divided into a first group of unprogrammed memory pages and a second group of unprogrammed memory pages. In this embodiment, the second pass voltage applied to a first group of word lines corresponding to the first group of unprogrammed memory pages and the second pass voltage applied to a second group of word lines corresponding to the second group of unprogrammed memory pages are different.

For example, as shown in FIG. 6B, the at least one unprogrammed memory page $PG_{n+1} \sim PG_{191}$ may include multiple unprogrammed memory pages $PG_{n+1} \sim PG_{191}$. The multiple unprogrammed memory pages $PG_{n+1} \sim PG_{191}$ could be divided into a first group of unprogrammed memory pages PGA, a second group of unprogrammed memory pages PGB and a third group of unprogrammed memory pages PGC, in which each includes a first group of word lines, a second group of word lines and a third group of word lines, respectively. In the present embodiment, the second pass voltages VPASSR' respectively applied to the first group of word lines, the second group of word lines and the third group of word lines are different from each other. The reason why the applied second pass voltages VPASSR' are different from each other could be that the vertical channel structures (not shown) formed in the memory blocks $BLK_1 \sim BLK_n$ including the corresponding memory strings (such as the memory strings $CS_0 \sim CS_m$) does not have the same size in each memory page, so that the corresponding second pass voltage VPASSR' could be applied according to conditions of each memory page.

In detail, as shown in FIG. 6B, when the selected memory block is the memory block $BLK_1$ (the open block), applying the read voltage Vread to the selected memory page (the memory page $PG_1$) of the plurality of programmed memory pages $PG_0 \sim PG_n$, applying the first pass voltages VPASSR to the unselected memory pages (the memory page $PG_0$ and the memory pages $PG_2 \sim PG_n$) of the plurality of programmed memory pages $PG_0 \sim PG_n$, applying the second pass voltage VPASSR1' to the first group of unprogrammed memory pages PGA (including the memory pages $PG_{n+1} \sim PG_{127}$) of the multiple unprogrammed memory pages $PG_{n+1} \sim PG_{191}$, applying the second pass voltage VPASSR2' to the second group of unprogrammed memory pages PGB (including the memory pages $PG_{128} \sim PG_{159}$) of the multiple unprogrammed memory pages $PG_{n+1} \sim PG_{191}$, and applying the second pass voltage VPASSR3' to the third group of unprogrammed memory pages PGC (including the memory pages $PG_{160} \sim PG_{191}$) of the multiple unprogrammed memory pages $PG_{n+1} \sim PG_{191}$. In some embodiments, the second pass voltage VPASSR1' is greater than the second pass voltage VPASSR2', and the second pass voltage VPASSR2' is greater than the second pass voltage VPASSR3', but the disclosure is not limited thereto.

In the present embodiment, the at least one unprogrammed memory page $PG_{n+1} \sim PG_{191}$ includes multiple unprogrammed memory pages $PG_{n+1} \sim PG_{191}$. The multiple unprogrammed memory pages $PG_{n+1} \sim PG_{191}$ are divided to the first group of unprogrammed memory pages (such as the first group of unprogrammed memory pages PGA) and the second group of unprogrammed memory pages (such as the second group of unprogrammed memory pages PGB). The first group of unprogrammed memory pages include the first group of word lines and the second group of unprogrammed memory pages include the second group of word lines, wherein the first group of word lines and the second group of word lines each include at least two word lines adjacent to each other, but the disclosure is not limited thereto.

In detail, the first group of word lines and the second group of word lines could include at least two word lines that are not adjacent to each other.

Figure 6C:
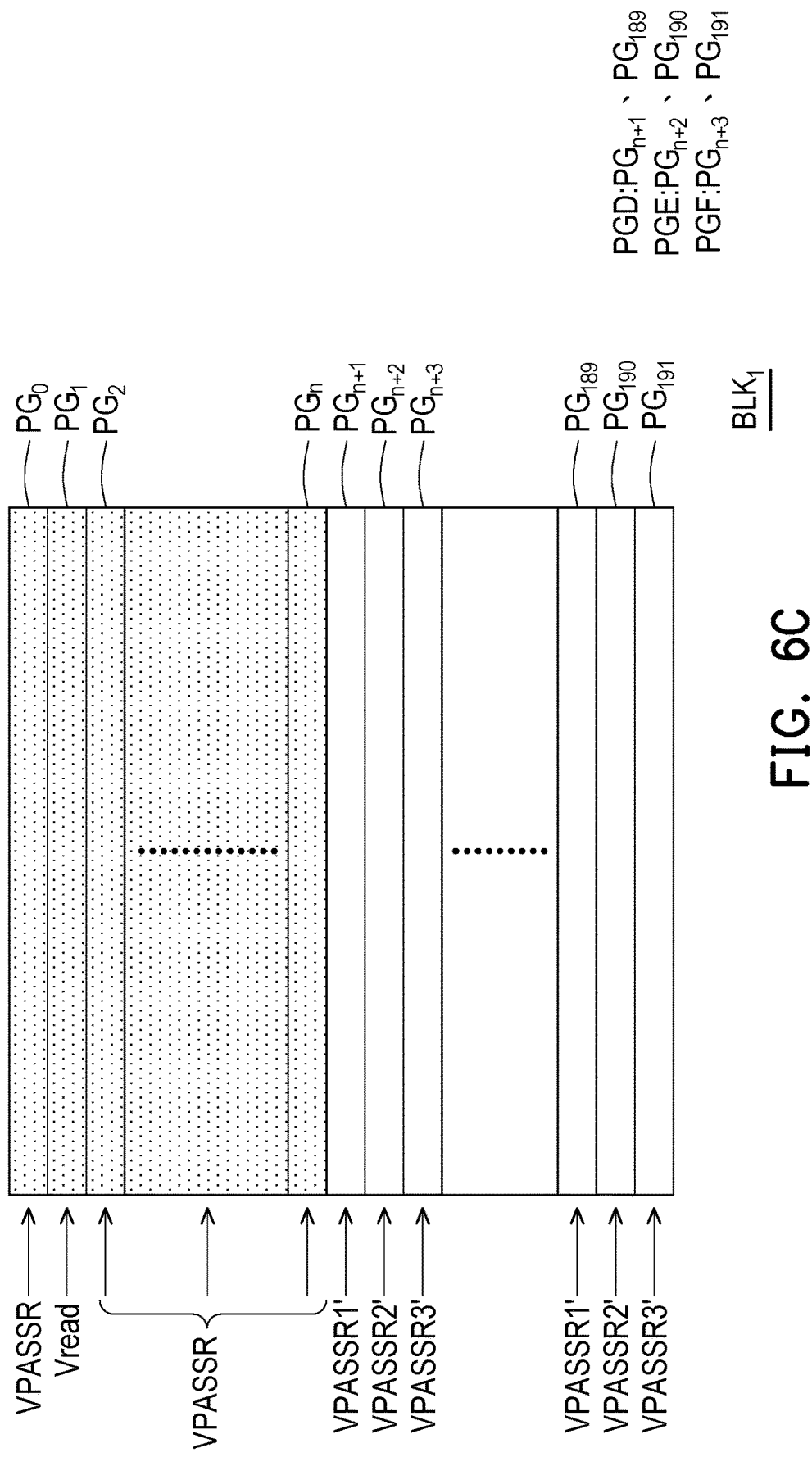
FIG. 6C is a schematic diagram illustrating a read operation performed on an open block in a memory array according to yet another embodiment of the disclosure.

For example, as shown in FIG. 6C, the at least one unprogrammed memory page includes multiple unprogrammed memory pages $PG_{n+1} \sim PG_{191}$. The multiple unprogrammed memory pages $PG_{n+1} \sim PG_{191}$ could be divided into three groups, including a first group of unprogrammed memory pages PGD, a second group of unprogrammed memory pages PGE and a third group of unprogrammed memory pages PGF, in which each includes a first group of word lines, a second group of word lines and a third group of word lines, respectively. In the present embodiment, the first group of word lines, the second group of word lines and the third group of word lines all include at least two word lines that are not adjacent to each other.

In detail, as shown in FIG. 6C, when the selected memory block is the memory block $BLK_1$ (the open block), applying the read voltage Vread to the selected memory page (the memory page $PG_1$) of the plurality of programmed memory pages $PG_0 \sim PG_n$, applying the first pass voltages VPASSR to the unselected memory pages (the memory page $PG_0$ and the memory pages $PG_2 \sim PG_n$) of the plurality of programmed memory pages $PG_0 \sim PG_n$, applying the second pass voltage VPASSR1' to the first group of unprogrammed memory pages PGD (including the memory pages $PG_{n+1}$ and $PG_{189}$) of the multiple unprogrammed memory pages $PG_{n+1} \sim PG_{191}$ applying the second pass voltage VPASSR2' to the second group of unprogrammed memory pages PGE (including the memory pages $PG_{n+2}$ and $PG_{190}$) of the multiple unprogrammed memory pages $PG_{n+1} \sim PG_{191}$, and applying the second pass voltage VPASSR3' to the third group of unprogrammed memory pages PGF (including the memory pages $PG_{n+3}$ and $PG_{191}$) of the multiple unprogrammed memory pages $PG_{n+1} \sim PG_{191}$.

It is worth mentioned that although FIG. 6C shows the first group of word lines corresponding the first group of unprogrammed memory pages PGD, the second group of word lines corresponding the second group of unprogrammed memory pages PGE and the third group of word lines corresponding the third group of unprogrammed memory pages PGF all include at least two word lines that are not adjacent to each other, but the disclosure is not limited thereto. For example, in other embodiments, the first group of word lines and the second group of word lines could include at least two word lines that are not adjacent to each other, while the third group of word lines could include at least two word lines that are adjacent to each other.

It is worth mentioned that, although a 3D memory device is taken as an example of the memory device 100 of the present embodiment, the operation method of the memory device 100 of the disclosure could be applied to a 2D memory device (e.g., a 2D NAND flash memory device). In addition, the operation method of the memory device 100 of the disclosure could be applied to a memory cell including a single-level cell (SLC), a multi-level cell (MLC), a triple-level cell (TLC), or a quad-level cell (QLC).

Based on the above, by making the first pass voltage applied to the unselected memory pages in the programmed memory pages greater than the second pass voltage applied to the at least one unprogrammed memory page, the read stress on the at least one unprogrammed memory page could be reduced. Therefore, the possibility of shortening the threshold voltage window of the memory cell in the at least one unprogrammed memory page could be reduced, so as to improve the reliability of the memory device. In other words, the disclosure could provide a 3D NAND flash memory with high capacity and high performance.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An operation method of a memory device, the memory device including a memory block comprising a first memory string and a second memory string, each of the first memory string and the second memory string having multiple memory cells connected in series, wherein each memory cell in the first memory string and the second memory string connected to a same word line belongs to a programmed memory page or an unprogrammed memory page, the operation method including:

performing a read operation on the memory block of the memory device, the memory block including a plurality of programmed memory pages and the at least one unprogrammed memory page, the read operation including:

applying a read voltage to a selected memory page of the plurality of programmed memory pages;

applying a first pass voltage to unselected memory pages of the plurality of programmed memory pages; and applying a second pass voltage to the at least one unprogrammed memory page, wherein the first pass voltage is greater than the second pass voltage, wherein a difference between the first pass voltage and the second pass voltage is greater than 300 mV.

2. The operation method of the memory device according to claim 1, wherein the at least one unprogrammed memory page include multiple unprogrammed memory pages corresponding to a first group of word lines and a second group of word lines, and the second pass voltage to the first group of word lines and the second pass voltage to the second group of word lines are different.

3. The operation method of the memory device according to claim 2, wherein the second pass voltage to the first group of word lines is greater than the second pass voltage to the second group of word lines.

4. The operation method of the memory device according to claim 2, wherein the first group of word lines and the second group of word lines respectively include at least two adjacent word lines.

5. The operation method of the memory device according to claim 2, wherein the first group of word lines and the second group of word lines respectively include at least two word lines that are not adjacent to each other.

6. The operation method of the memory device according to claim 1, further comprising:

performing a program operation on the memory device; and recording a programming state of the memory block of the memory device.

7. The operation method of the memory device according to claim 6, wherein recording the programming state of the memory block including distinguishing the programmed memory pages from the at least one unprogrammed memory page.

8. The operation method of the memory device according to claim 6, wherein utilizing a controller to record the programming state of the memory block, and the controller is coupled to the memory device.

9. The operation method of the memory device according to claim 7, wherein distinguishing the programmed memory pages from the at least one unprogrammed memory page including recording a last memory page that the program operation is performed on the memory block.

10. A memory system, comprising:

a memory device, comprising:

a memory cell array, comprising a plurality of memory blocks, wherein one of the memory blocks comprising a first memory string and a second memory string, each of the first memory string and the second memory string having multiple memory cells connected in series, wherein each memory cell in the first memory string and the second memory string connected to a same word line belongs to a programmed memory page or an unprogrammed memory page;

an address decoder, coupled to the memory cell array;

a voltage generator, coupled to the address decoder and configured to generate voltages provided to the programmed memory page and the unprogrammed memory page;

a page buffer, coupled to the memory cell array; and a control logic, coupled to the address decoder, the voltage generator and the page buffer; and a controller, coupled to the memory device, and configured to propose a read command to the memory device to control a read operation performed in the memory device, wherein the control logic determines a voltage value of a pass voltage provided to the programmed memory page and the unprogrammed memory page in the read operation in accordance with a programming state of the memory device, wherein the pass voltage includes a first pass voltage applied to the programmed memory page and a second pass voltage applied to the at least one unprogrammed memory page, and the first pass voltage is greater than the second pass voltage, wherein a difference between the first pass voltage and the second pass voltage is greater than 300 mV.

11. The memory system according to claim 10, wherein the at least one unprogrammed memory page include multiple unprogrammed memory pages corresponding to a first group of word lines and a second group of word lines, and the second pass voltage to the first group of word lines and the second pass voltage to the second group of word lines are different.

12. The memory system according to claim 11, wherein the second pass voltage to the first group of word lines is greater than the second pass voltage to the second group of word lines.

13. The memory system according to claim 11, wherein the first group of word lines and the second group of word lines respectively include at least two adjacent word lines.

14. The memory system according to claim 11, wherein the first group of word lines and the second group of word lines respectively include at least two word lines that are not adjacent to each other.

15. The memory system according to claim 10, wherein the controller is further configured to perform a program operation on the memory device and to record a programming state of the plurality of memory blocks of the memory device.

16. The memory system according to claim 15, wherein the programming state includes a state that at least one of the plurality of memory blocks is an open block.

17. The memory system according to claim 15, wherein the controller includes a storage unit, the storage unit recording the programming state of the plurality of memory blocks.

18. The memory system according to claim 16, wherein an information of the programming state recorded by the controller includes a last memory page that the program operation is performed on the plurality of memory blocks.

* * * * *